United States Patent
Ramos et al.

(10) Patent No.: US 9,165,186 B1
(45) Date of Patent: Oct. 20, 2015

(54) PROVIDING ADDITIONAL INFORMATION FOR TEXT IN AN IMAGE

(71) Applicant: Amazon Technologies, Inc., Reno, NV (US)

(72) Inventors: David Paul Ramos, Cambridge, MA (US); Matthew Joseph Cole, Arlington, MA (US); Matthew Daniel Hart, Cambridge, MA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/291,493

(22) Filed: May 30, 2014

(51) Int. Cl.
*G06K 9/00* (2006.01)

(52) U.S. Cl.
CPC .................... *G06K 9/00442* (2013.01)

(58) Field of Classification Search
CPC .......... G06K 9/00442; G06K 9/00449; G06K 9/00456; G06K 9/00463; G06K 9/00469; G06K 9/00154; G06K 9/00161; G06K 9/00852; G06K 9/00859; G06K 9/00865; G06K 9/00872; G06K 9/00879
See application file for complete search history.

(56) References Cited

U.S. PATENT DOCUMENTS

| | | | | |
|---|---|---|---|---|
| 6,665,841 B1 * | 12/2003 | Mahoney et al. | ............. | 715/204 |
| 7,743,347 B2 * | 6/2010 | Graham et al. | ............. | 715/863 |
| 8,539,344 B2 * | 9/2013 | Hull et al. | ............. | 715/255 |
| 8,635,531 B2 * | 1/2014 | Graham et al. | ............. | 715/716 |
| 8,811,742 B2 * | 8/2014 | Petrou et al. | ............. | 382/187 |
| 9,002,052 B2 * | 4/2015 | Ryu | ............. | 382/100 |

* cited by examiner

*Primary Examiner* — Brian Le

(74) *Attorney, Agent, or Firm* — Weaver Austin Villeneuve & Samspon LLP

(57) ABSTRACT

Disclosed are techniques for providing additional information for text in an image. In some implementations, a computing device receives an image including text. Optical character recognition (OCR) is performed on the image to produce recognized text. One or more topics corresponding to the recognized text is determined. A word or a phrase is selected from the recognized text for providing additional information. One or more potential meanings of the selected word or phrase are determined. One of the potential meanings is selected using the one or more topics. A source of additional information corresponding to the selected meaning is selected for providing the additional information to a user's device.

18 Claims, 3 Drawing Sheets

PROVIDING ADDITIONAL INFORMATION FOR TEXT IN AN IMAGE

BACKGROUND

Optical Character Recognition (OCR) generally refers to the identification of text in sources such as digital photos or scanned images and output of the identified text into computer-encoded and computer-readable textual data. OCR can be used to digitize text appearing in images so the Optical Character Recognized (OCR'd) text can be stored in computer memory, edited, searched, displayed, and used in automated processes. For example, OCR can be used in pattern recognition, artificial intelligence and computer vision. OCR'd text from digital photos and video frames can have inaccuracies due to inherent limitations of conventional OCR processes and due to problems with image data such as lack of focus and contrast, incomplete textual strings, and other flaws of an image captured using a modern device. In addition, OCR'd text in the abstract may provide insufficient information for a computer to further process the text or for a user to effectively act on the recognized text.

DETAILED DESCRIPTION

Figure 1:
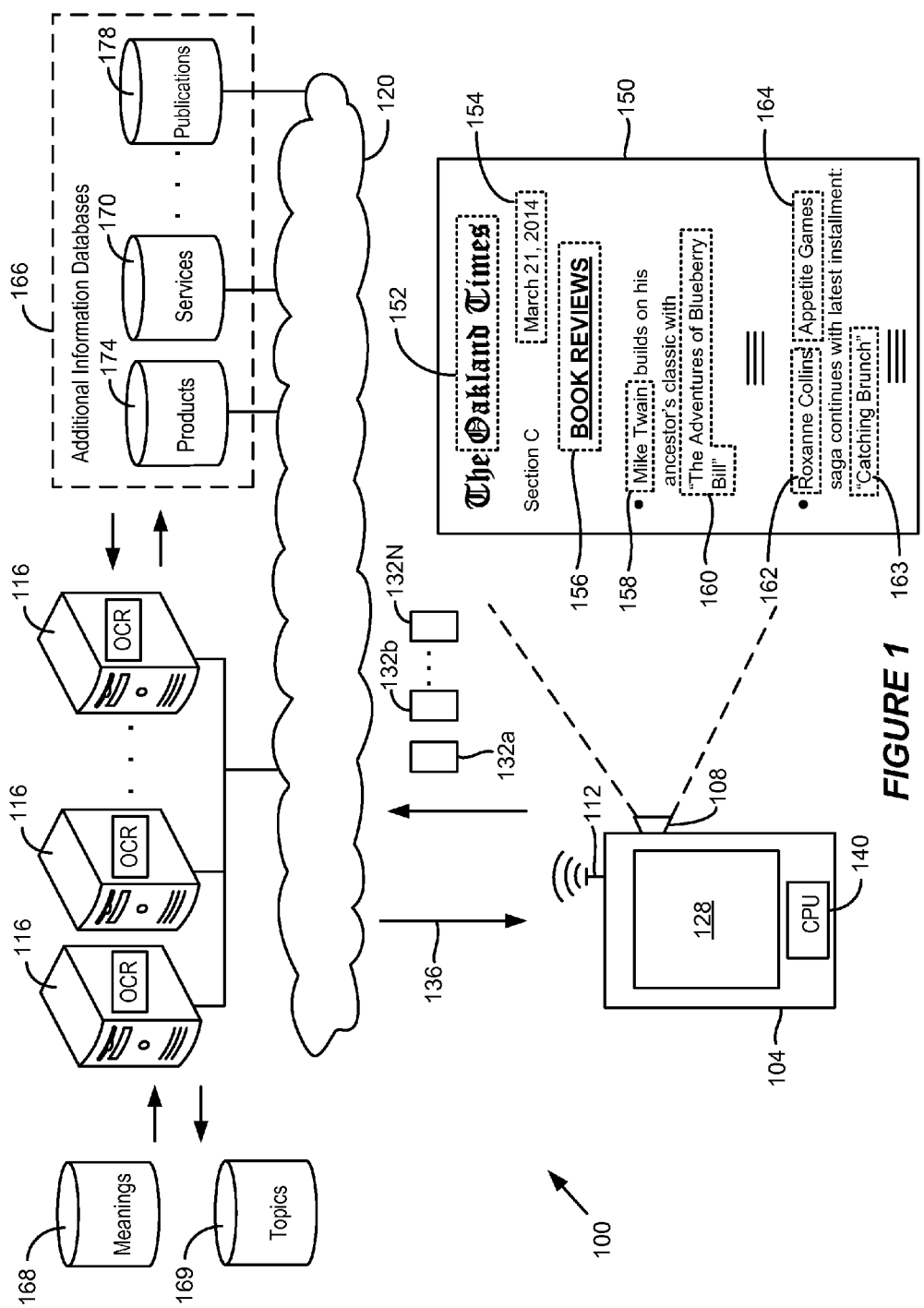
FIG. 1 shows an example of a system 100 for providing additional information for text in an image, according to some implementations.

This disclosure describes techniques for providing additional information for text in an image. The disclosed techniques can be practiced to provide an immersive experience in which topics and/or various characteristics can be used to determine meanings of words and to retrieve helpful data related to those meanings for a user. For example, when a news article is captured by a user's computing device such as a tablet or smartphone, selected words in the article can be identified, and additional information about the article's author and about any people, places, objects, organization, etc. mentioned in the article can be automatically retrieved. For example, characteristics included in or referenced by the captured scene can be used to determine that the user is reading a newspaper, in which case additional news articles related to significant words in the text can be retrieved. In another example, if it is determined that the user is reading a particular magazine, other articles from that magazine's publication history that are relevant to certain words and/or topics can be retrieved. This additional information can be delivered to the user's computing device and displayed in a user interface (UI) on a display of the device.

By way of example, a camera-equipped smartphone captures a scene to generate an image such as a digital photo or generate a sequence of images such as a video stream. When Optical Character Recognition (OCR) is performed on the image to recognize text in the image, a word or phrase of the recognized text can be selected for providing additional information. Topics can be used to select one of several possible meanings for the word or phrase. For instance, an identified topic can facilitate automatic selection of the most relevant of several possible definitions of a word. The filtered words can then be tagged with a selected meaning. The selected meaning can be used to identify additional information which may be helpful to a user, and the additional information can be communicated to a user's device.

In some implementations, an initial screening of recognized text to select a word or phrase for providing additional information is engineered to err on the side of being over-inclusive, that is, to identify any words of possible interest in the frame. For example, any word in the form of an acronym, a noun, and/or having a capitalized letter can be identified as being significant. In another example, any word appearing in a designated database, in a designated database record or on a designated website can be identified as having some significance. In such implementations, later processing using topical information can refine an initial set of possibly interesting words or phrases.

In some implementations, when determining the meaning of a word, language models can be constructed and maintained using database entries to generate probabilities of words occurring in the same string of Optical Character Recognized (OCR'd) text. In this way, the most relevant meaning of a word can be identified based on the current usage of a word in a frame. By the same token, if none of the possible meanings of the word have a sufficient likelihood of being relevant, those meaning can be discarded. In some implementations, as an alternative to using language models, OCR'd text can be screened against entries in a designated database. Any words appearing in or referenced by a database entry that match the OCR'd text can be returned as additional information. The most appropriate database entries can also or alternatively be determined by screening a topic for a word against the database.

In some of the disclosed implementations, a client device such as a camera-equipped smartphone or other mobile device equipped with a camera captures frames of image data as still images or as a video stream, for instance, by a user aiming the device at a scene and snapping digital photos or recording video of the scene. As frames are captured, the client device can send the frames to a server device configured to recognize text in each frame by performing OCR on the data of each frame to generate OCR'd text for the frame. As part of the OCR processing, or at a later processing stage, techniques described below can be performed. The server can send the OCR'd text of each frame back to the client for additional processing and presentation to the user, for instance, in a UI on a display of the client device.

FIG. 1 shows an example of a system 100 for providing additional information for text in an image, according to some implementations. In FIG. 1, a mobile device in the form of a smartphone 104 including a camera 108 is carried by a user. The smartphone 104 is one example of various types of devices, which can be used in conjunction with the techniques disclosed herein. For example, as an alternative to a smartphone, the user's device can be a wearable display device, a tablet, a laptop, or a desktop computer system. In this example, smartphone 104 includes an antenna 112 in wireless communication with a plurality of servers 116 via a network 120. Those skilled in the art should appreciate that network 120 can be in the form of any number of networks combined to provide communication between servers 116 and any number of client devices, such as smartphone 104. In FIG. 1, network 120 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

In FIG. 1, the user can point camera 108 of smartphone 104 at any of various scenes including physical objects such as a newspaper 150. The camera 108 of smartphone 104 is operable to capture snapshots of scenes as image frames, for instance, when the user presses a selection on a touch screen display 128 of smartphone 104. The captured image can be binarized, for example, to provide image data of each frame. In this example, the binarization is performed by smartphone 104 to generate frames 132a-132N of digital image data.

In other examples, smartphone 104 is configured to shoot video of scenes using camera 108. In some other examples, smartphone 104 is capable of receiving streamed video over network 120. In such examples, frames 132a-132N are frames of a video stream. The disclosed techniques are applicable to both live camera feeds as well as clusters of still images captured by taking individual snapshots of a scene. Also, in some implementations, frames of image data are captured automatically by smartphone 104, that is, without user input causing snapshots or video to be captured.

In FIG. 1, a user sitting at a café is reading newspaper 150. The user has decided to point camera 108 at newspaper 150. For example, the user may be interested in capturing the title or content of an article for any or various reasons such as emailing the scene to a friend or accessing a website to search on keywords appearing in the scene. In this example, when the user points camera 108 at newspaper 150 and snaps a digital photo, frame 132a is generated. The user can generate additional frames 132b-132N by taking additional digital photos of newspaper 150. For example, other pages or regions of a page of newspaper 150 can be captured in additional frames. One or more of the various textual items such as headings, sub-headings, articles, advertisements, and other entities printed in newspaper 150 can be captured in such a manner.

In FIG. 1, as soon as frame 132a has been captured by smartphone 104, smartphone 104 can transmit frame 132a to any of servers 116. As additional frames 132b-132N are captured, these frames can be separately transmitted from smartphone 104 to servers 116. The servers 116 are configured with OCR processing engines to perform OCR on frames of image data received from devices such as smartphone 104. In some implementations, servers 116 are also configured to perform error correction on OCR'd text from a frame. Results 136 of OCR'd text from frames of image data can be sent from servers 116 back to smartphone 104 as soon as such results are obtained, as shown in FIG. 1. The smartphone 104 has one or more processing modules, for example, in the form of a CPU 140 configured to perform additional processing on OCR'd text results 136 from servers 116.

In some implementations, servers 116 are stateless. One or more of servers 116 are configured to perform OCR as soon as the frame is received and immediately return the OCR'd text as a result to a client device, which sent the frame to the server. In some implementations, smartphone 104 transmits frames 132a-132N to servers 116 for processing as soon as each frame is available to be sent. That is, in some implementations, the client device does not wait for OCR'd results of a first frame such as frame 132a to be returned before transmitting a second frame, such as frame 132b. By the same token, the client device does not need to wait for OCR'd results before taking additional snapshots of a scene and transmitting frames of those snapshots to servers 116 for processing. Thus, the sending of frames 132a-132N and the receiving of OCR'd results 136 between smartphone 104 and servers 116 are asynchronous, in the example of FIG. 1. A client device such as smartphone 104 listens for and processes results 136 asynchronously with respect to sending frames 132a-132N.

Figure 2:
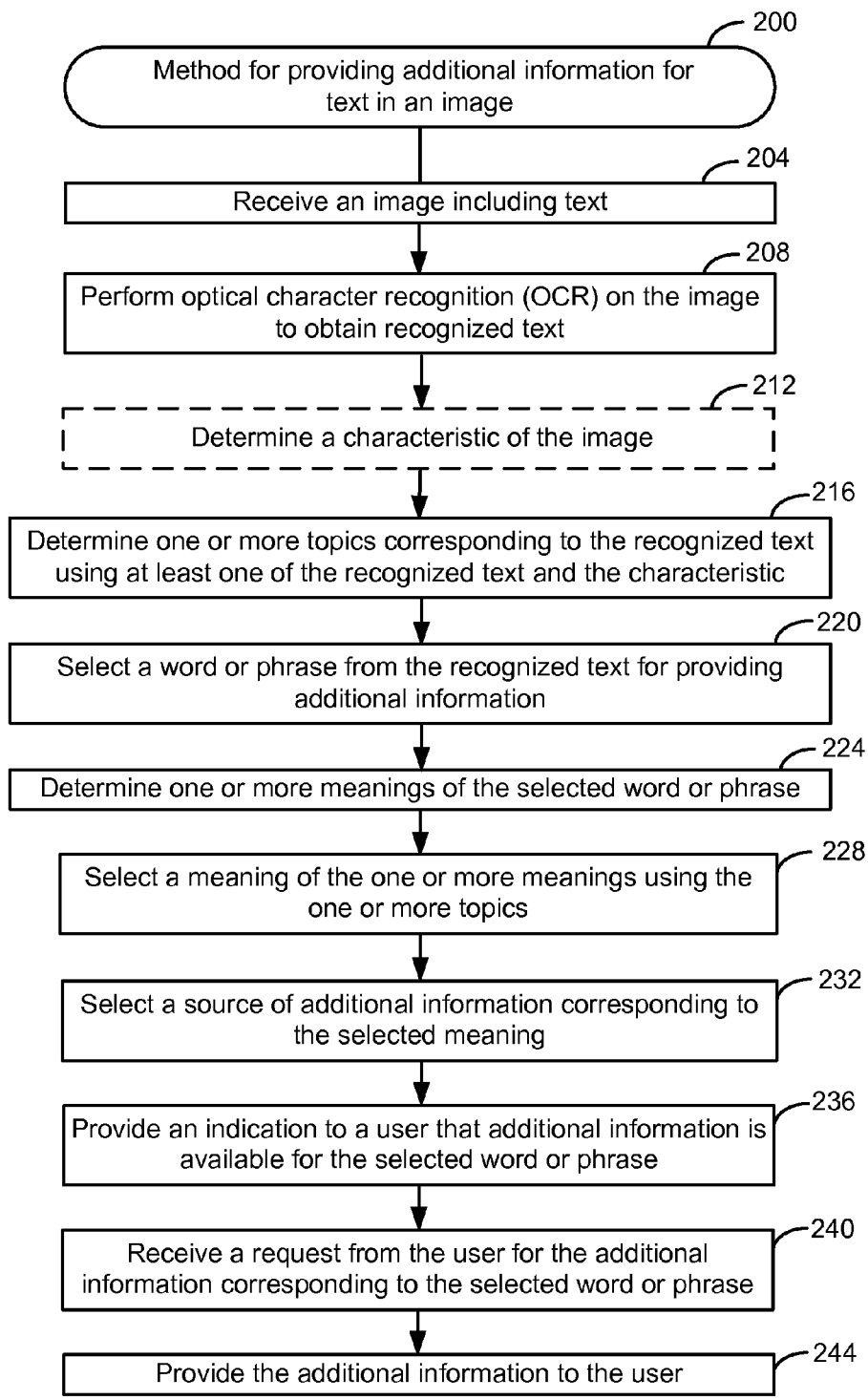
FIG. 2 shows an example of a method 200 for providing additional information for text in an image, performed according to some implementations.

FIG. 2 shows an example of a method 200 for providing additional information for text in an image, performed according to some implementations. At 204, one or more of servers 116 in FIG. 1 receives an image including text, for instance, in the form of a frame of image data from smartphone 104. For example, a server can receive frame 132a including part or all of the text on a page of newspaper 150, as shown in FIG. 1. The content of the image received at 204 can include a wide variety of scenes and objects in scenes. A newspaper is one example of an object captured in an image that includes text. Other examples of textual objects include a poster, a sign, a billboard, a book, etc.

At 208 of FIG. 2, one or more of servers 116 performs OCR on the image data of frame 132a to produce recognized text. For example, textual items 152-164 on newspaper 150 as shown in FIG. 1 can be OCR'd. In some implementations, before OCR'ing an image, the image is segmented into different zones, and an OCR process is separately performed on each zone. For example, an image of newspaper 150 can be segmented into different articles such as a Mike Twain article and a Roxanne Collins article, and others. The font size or style of headings and sub-headings appearing in the image and the locations of such text can be used to identify different spatial regions of the image as zones.

In FIG. 2, at 212, in some implementations, a server is configured to determine a characteristic of the image. In some other implementations, 212 is omitted and method 200 proceeds from 208 to 216. At 212 of FIG. 2, a characteristic such as a designated word, name or phrase can be identified in the recognized text such as "Oakland Times", "Mike Twain", "Adventures of Blueberry Bill", "Roxanne Collins", etc. in items 152-164 of FIG. 1. At 212, a wide variety of characteristics relevant to the recognized text of the image can be identified, such as a date indicated by a timestamp stored in metadata of the image, a geographic location at which the image was captured (also identified in metadata), a source of the recognized text, and other various information recorded in metadata. In the example of FIG. 1, the source of textual items 152-164 can be identified as a newspaper or a particular title of a newspaper such as The Oakland Times. In some other instances, the characteristic is identified by recognizing other objects in the image, such as logos, using known object recognition algorithms to do the matching.

Strings of text such as words, phrases, and other types of characteristics can be matched with databases of known text (books, newspapers, etc.). At 212 of FIG. 2, "Oakland Times" in item 152 of FIG. 1 can be recognized as appearing in a publications database 178. Recognized text can be screened against various databases in addition to publications database 178, such as a services database 170 and a products database 174. In another example, a characteristic in the form of a date such as "Mar. 21, 2014" in item 154 of FIG. 1 can be determined at 212 of FIG. 2. At 212 of FIG. 2, recognized text such as the names of authors "Mike Twain" in item 158 and "Roxanne Collins" in item 162 can be matched with a books database. By the same token, the names of books in items 160 and 163 can also be identified as having some significance if those book titles appear in a books database.

In other examples, characteristics identified at 212 can include geographic locations. For instance, geo-location data received from smartphone 104 can be provided to an online maps service to determine a street address, a neighborhood, a city, a state or other geographic region serving as a characteristic. Those skilled in the art should appreciate that such geographic locations can be categorized and maintained using available online services and/or customized databases.

Another example of a characteristic at 212 is an object, for instance, appearing in an image. In the example of FIG. 1, an object could be an illustration, a logo, a trademark, etc. appearing on newspaper 150. Other examples of objects serving as characteristics include physical objects such as a table, a chair, a food item, a person's face, a sign or other entities appearing in an image with newspaper 150. In the example of FIG. 1, such objects could appear in the background of a scene where a photo of newspaper 150 was taken. By the same token, newspaper 150 can serve as such an object. Another example of a characteristic is a source of an item included in a scene. In the example of FIG. 1, "The Oakland Times" can be identified as the source with reference to publications database 178, which identifies "The Oakland Times" as the title of a newspaper.

As mentioned above, one or more databases can be configured to maintain characteristics relevant for particular implementations. By way of example, in FIG. 1, parameters such as names, categories, prices and reviews of products can be maintained and associated with particular products in products database 174, so a product can be identified as a characteristic. Parameters of services can be maintained in services database 170 for similar lookup, while publications database 178 can store parameters in the forms of authors, titles, categories, topics, publication dates and other various bibliographic information to identify particular newspapers, magazines, books, etc. as characteristics.

Thus, in some implementations, at 212 of FIG. 2, determining a characteristic can include identifying an attribute of a scene, such as a word, phrase, sentence, object, color, date, name, acronym, trademark, logo, slogan, object, person, etc. appearing in or referenced by an image. A database lookup can be performed using the attribute to identify one or more characteristics maintained in one or more databases, for example, in additional information databases 166 of FIG. 1. When any database parameters match the attribute, the image or a zone of the image being processed can be tagged with the characteristic, for example, by storing the characteristic in metadata of the image.

In FIG. 2, at 216, one or more topics can be determined as corresponding to the recognized text from 208 using the recognized text and/or any characteristic determined when the optional processing at 212 is performed. In some implementations, text can be matched with a designated website or a designated webpage of known text. For example, recognized text can be cross-referenced with an online encyclopedia such as Wikipedia® or with a specific topic page of a blog site to find a best match. By the same token, words, phrases, sentences, etc. can be cross-referenced with social media sites or specific pages of a social media site to match the text with posts, comments and various other social media communications included in a news feed. In some other implementations, a suitable database or database system such as a topics database 169 of FIG. 1 can be implemented and maintained to store topics and information about topics. For example, topics database 169 of FIG. 1 stores an index of various topics, where relevant text and characteristics are stored in association with each topic for identification of one or more topics at 216 of FIG. 2.

In FIG. 2, at 220, a word or phrase from the recognized text (by performing OCR at 208) is selected for providing additional information. In some implementations, the processing at 220 begins by screening the text for any words or phrases having one or more properties such as a designated number of letters, initial capital letters, all capital letters, acronyms, and/or other formatting such as specified font styles and sizes, underlining as in item 156 of FIG. 1, or quotation marks as in items 160 and 163. Such properties can serve as cues to select text for providing additional information. In some implementations, in addition to or as an alternative to identifying properties of text, a word or phrase can be selected at 220 using any topics determined at 216 and/or any characteristic determined when the processing of 212 is performed. For example, a topic can be used to determine a word or phrase as likely to be important when the word or phrase is cross-referenced with that topic in a database or appears on an online encyclopedia page dedicated to that topic. In another example, an initial set of words or phrases identified as being in the form of acronyms or having initial capital letters can be further filtered using one or more topics and/or characteristics to identify a subset of words, which are deemed as likely to be important. In some instances when topics are used as filters, a list of likely important words can be generated on a per-topic basis. In some other implementations, named entity recognition techniques used in speech processing can be used to select likely important words or phrases at 220 that correspond to entries in one or more databases.

At 224, one or more potential meanings for a text string such as a word or phrase selected at 220 can be determined. For example, online dictionaries, online encyclopedias and/or proprietary databases such as a meanings database 168 of FIG. 1 with meanings and interpretations of words and phrases can be accessed at 224. Often a word or phrase will have multiple possible meanings in one or across multiple reference sources, in which case all definitions and interpretations of the text being processed can be retrieved at 224.

Figure 3:
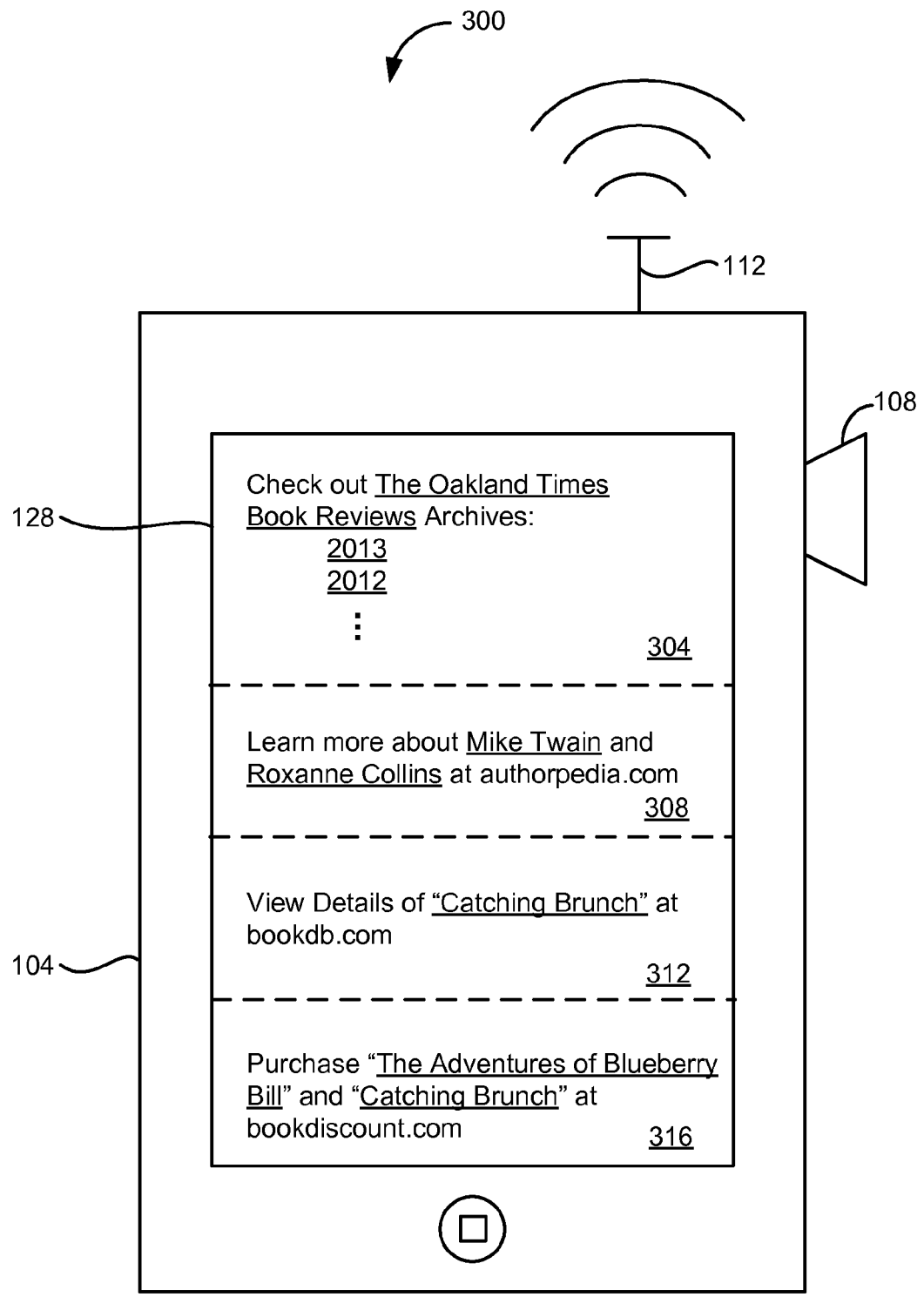
FIG. 3 shows an example of a display state 300 of a user's device showing additional information for a selected word or phrase, according to some implementations.

In FIG. 3, at 228, one of the possible meanings of a word or phrase from 224 is selected. In some implementations, any topic or topics determined at 216 can be used as filters to select one of the various possible definitions and interpretations identified at 224. For example, a topic can be used to determine whether a meaning of a word or phrase is relevant. Words appearing in each meaning can be compared with the topics and/or with words describing the topics to select a meaning. For example, a meaning can be selected as being relevant at 228 when the topic, in the form of a word or phrase, appears in the meaning or has a synonym appearing in the meaning. Other words in a sentence or otherwise recognized in an image can also be matched with words of a potential meaning to indicate higher relevance of the meaning to the text being processed. Those skilled in the art should appreciate that in some implementations an online service such as Wikipedia® disambiguation can be used to ascertain the most relevant meaning of a word or phrase when interpreted in light of a corresponding topic. The word or phrase can be tagged or otherwise associated with the selected meaning(s).

In some implementations, in the example of FIG. 1, a language model in communication with or implemented as a processing module of any of servers 116 can be used to process words for the purpose of identifying potential relevant meanings. For example, a language model can be configured to identify probabilities of words appearing in a textual string in proximity to a word or phrase being processed. For example, when other words in a textual string are situated within a designated number of words or within the same sentence or paragraph of the text being processed, and those words have a sufficiently high probability, those words can be compared with and used to select one or more potential meanings.

In FIG. 2, at 232, a source of additional information corresponding to the selected meaning is selected. For example, one of the databases 170, 174 or 178 of additional information databases 166 in FIG. 1 can be selected as the source. To select a particular source, the one or more topics and/or words of the selected meaning can be compared with parameters in one or more databases to identify any matches. For instance, a topic may match a product name or product category in products database 174. In implementations where a characteristic of the image is determined at 212 of FIG. 2, the characteristic can also or alternatively be used to identify a relevant or most relevant source of additional information corresponding to the selected meaning. In the example of FIG. 1, when a characteristic of newspaper 150 has been identified as an edition of The Oakland Times, other Oakland Times articles stored in publications database 178 in FIG. 1 can be identified as additional information of possible interest to the user. Also, articles in database 178 can be scored according to how recently an article was published and/or using one or more additional criteria such as how many times a word, phrase, topic, characteristic, etc. associated with the image appears in the article. For example, the most recent article mentioning a word or phrase greater than a threshold number of times can be selected. In this way, a more relevant and helpful article or subset of articles can be retrieved.

At 232 of FIG. 2, any of a wide variety of sources of additional information can be accessed and/or checked for the purpose of selecting an appropriate source or sources of additional information. Such sources can include proprietary databases, publicly available databases, web sites, social media sites, and blogs. One example of a source of additional information in FIG. 1 is publications database 178 with entries identifying publications and related parameters, according to some implementations. For example, categories of publications in the form of books, magazines and/or newspapers can be maintained. Those skilled in the art should appreciate that each category can be maintained as a separate database, in which case publications database 178 can be a system or collection of databases storing bibliographic information and other parameters for different types of publications.

In the simplified example of FIG. 1, columns of a database table in publications database 178 can identify parameters such as title, author, newspaper name, city or other geographic region, publication date, reviews, etc. for various newspaper articles stored as entries in rows of the table. Entries in the table can include a pointer to another database storing various additional parameters of each newspaper, such as names of contributing writers, topics, article names, publication dates, etc. In some implementations, each entry in a database table also points to a database storing content of the various editions of the newspaper that can be indexed according to publication date, names of contributing writers, names of articles, article content, advertisements, and other parameters. Thus, in some implementations, the table can be configured with pointers to online editions and archives maintained by an organization owning the newspaper.

A products database 174 of FIG. 1 is another example of a database serving as a source of additional information that can be accessed and selected at 232. In the example of products database 174, database entries can be in the form of product information records, where each record identifies a product and includes parameters of the product. Examples of parameters include product names, categories, manufacturers, sellers, related products, customer reviews, and other information. In one example, products database 174 can be structured to have product images as parameters. Thus, when a client device such as smartphone 104 snaps a digital photo of a product in a scene, a server can identify part or all of an entity captured in the photo as a characteristic to be compared with images stored in products database 174. For example, a digital photo of the physical cover of a popular novel having a certain color, pattern, font or other indicia serving as an attribute can be processed to compare the attribute with product parameters in database 174. Thus, the identified entity in the image can be matched with a product image in database 174 having the same or similar attributes.

At 232 of FIG. 2, when determining which source(s) of additional information to select, in some implementations, any attribute or attributes of an image can be compared with parameters of various database entries. Thus, in the example of publications database 178 of FIG. 1, an attribute of newspaper 150 of FIG. 1 such as the title in item 152 can be identified in as a title of a newspaper in database 178. Additional attributes of the scene such as publication date in item 154, the "Book Reviews" section identified in item 156, and other various objects and entities can be provided as attributes to compare with parameters of a newspaper identified in database 178. By the same token, other environmental attributes such as geo-location data of smartphone 104 stored as metadata with an image can be used. For example, before accessing publications database 178, geo-location data can be used to select a subset of newspapers published in cities within a specified geographic radius of the location of smartphone 104.

In FIG. 2, at 236, an indication can be generated and output on a user's device to inform the user when additional information is available for any selected words or phrases at 220. For example, as illustrated in FIG. 1, a user interface displaying an image of newspaper 150 on display 128 of smartphone 104 can overlay boxes with dashed lines around textual items 152-164 for which additional information is available. Other types of indications are possible such as pop-up messages, animated icons, highlights, increased font size, etc.

In FIG. 2, at 240, a request is received from the user for the additional information corresponding to the selected word or phrase. For example, in FIG. 1, a user can touch any textual item displayed on smartphone 104 that has an overlay box, and this user action can be communicated as a request to a server implementing method 200 of FIG. 2.

In FIG. 2, at 244, in response to receiving the request at 240, the requested additional information is transmitted to the user's device for display to the user. For example, a server can send the additional information to smartphone 104 for presentation on display 128. In an alternative example, when one or more of the operations of method 200 are performed by CPU 140 of smartphone 104, at 236, smartphone 104 outputs the additional information to display 128. In some implementations, at 244 of FIG. 2, any data included in or otherwise associated with matching database entries can be retrieved and sent to the user's device. For example, returning to FIG. 1, when one of the books mentioned in newspaper 150 is identified in a books database, various bibliographic information pertaining to the book can be retrieved and sent to smartphone 104 of FIG. 1 for display. By the same token, other editions of The Oakland Times having relevant content, such as other book reviews or other editions mentioning Mike Twain or Roxanne Collins can be retrieved and sent to the user's device at 244.

FIG. 3 shows an example of a display state 300 of a user's device showing additional information provided at 244 of FIG. 2, according to some implementations. In FIG. 3, various types of data have been delivered to smartphone 104 and output on display 128 in response to a user tapping graphically highlighted textual items 152-164 presented on display 128 in regions 304-316. These regions can be displayed as pop-up windows or panes which overlay an image of newspaper 150 or can be displayed in a web browser on smartphone 150. In this example, in region 304 of FIG. 3, when a user taps "Oakland Times' item 152 of FIG. 1, links to yearly archives maintained at a website such as oaklandtimes.com are displayed. Thus, a user can tap "2013" or "2012" in FIG. 3, causing a webpage from oaklandtimes.com with an index of that year's book reviews to be loaded by a web browser operating on smartphone 104 and displayed on display 128. Other examples of actionable content in display 128 include a link to Mike Twain's and Roxanne Collins' pages at the website, authorpedia.com in region 308, which is generated in response to a user tapping item 158 or item 162 in FIG. 1. In this example, region 308 of display 128 has been generated by identifying items 158 and 162 of FIG. 1 as authors in a books database in implementations where each entry in the books database includes a pointer to the author's bio page at the website, authorpedia.com.

In FIG. 3, in region 312, when item 163 of newspaper 150 of FIG. 1 is selected, a link to a webpage with details about the title "Catching Brunch" maintained at a website, bookdb.com can be generated so that a user can tap the displayed text to access that site. In FIG. 3, region 316 of display 128 is displayed in response to a user tapping the book titles identified in items 160 and 163 of newspaper 150 of FIG. 1. In this example, the book titles have been identified in products database 174 and/or publications database 178. When either or both of databases 174 and 178 are maintained by or on behalf of a book seller, such as bookdiscount.com, in region 316 of FIG. 3, links to pages selling the books of interest at bookdiscount.com can be generated, so a user is provided with an option to tap or otherwise select the displayed link to purchase the books.

Various types of computing events can be caused to occur by tapping or otherwise selecting an actionable text item displayed on display 128 include generating a social media post to a news feed of a social networking system as referenced by the displayed text, generating a text message to a person or phone number identified by the displayed text, and generating an instant message (IM) to be sent to a user identified by the displayed text using appropriate channels.

It should be noted that, despite references to particular computing paradigms and software tools herein, computer program instructions on which various implementations are based may correspond to any of a wide variety of programming languages, software tools and data formats, and be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, references to particular protocols herein are merely by way of example. Suitable alternatives known to those of skill in the art may be employed.

Any of the components, modules, models, engines and operations described herein may be implemented at least in part as software code to be executed by a processor using any suitable computer language such as Java, C++ or Perl, by way of example only. The software code may be stored as a series of instructions or commands on a computer-readable medium for storage and/or transmission. Suitable computer-readable media include random access memory (RAM), read only memory (ROM), a magnetic medium such as a hard-drive or a floppy disk, an optical medium such as a compact disk (CD) or DVD (digital versatile disk), flash memory, and the like. The computer-readable medium may be any combination of such storage or transmission devices. Computer-readable media encoded with the software/program code may be packaged with a compatible computing device such as a client device or a server device as described above or provided separately from other devices. Any such computer-readable medium may reside on or within a single computing device or an entire computer system, and may be among other computer-readable media within a system or network. A computing device such as the client devices described above may include a monitor, printer, or other suitable display for providing any of the results mentioned herein to a user.

While the subject matter of this application has been particularly shown and described with reference to specific implementations thereof, it will be understood by those skilled in the art that changes in the form and details of the disclosed implementations may be made without departing from the spirit or scope of this disclosure. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope should not be limited by reference to such advantages. Rather, the scope should be determined with reference to the appended claims.

What is claimed is:

1. A non-transitory computer-readable storage medium storing instructions executable by one or more processors to cause a method to be performed for providing additional information for text in an image, the method comprising:
   receiving, from a client device in communication with a server device via a network, an image including text;
   performing optical character recognition on the image to produce recognized text;
   determining a characteristic of the image;
   determining one or more topics corresponding to the recognized text using at least one of the recognized text and the characteristic;
   selecting a word or a phrase from the recognized text for providing additional information;
   determining one or more potential meanings of the selected word or phrase;
   selecting a meaning of the one or more potential meanings using the one or more topics;
   selecting a source of additional information corresponding to the selected meaning;
   providing an indication to the client device that additional information is available for the selected word or phrase;
   receiving a request from the client device for the additional information corresponding to the selected word or phrase; and
   sending the additional information to the client device.

2. The non-transitory computer-readable storage medium of claim 1, wherein the source of additional information corresponding to the selected meaning is selected using at least one of the recognized text and the characteristic.

3. The non-transitory computer-readable storage medium of claim 1, wherein the selected source of information is: a products database including product information records each identifying a product and including product information characterizing the identified product, or a publications database including publication records each identifying a publication and including publication information characterizing the identified publication.

4. One or more server devices comprising:
one or more processors operable to cause a server device to:
receive, from a client device in communication with the server device via a network, an image including text;
perform optical character recognition on the image to produce recognized text;
determine one or more topics corresponding to the recognized text;
select a word or a phrase from the recognized text for providing additional information;
determine one or more potential meanings of the selected word or phrase;
select a meaning of the one or more potential meanings using the one or more topics;
select a source of additional information corresponding to the selected meaning;
provide an indication to the client device that additional information is available for the selected word or phrase;
receive a request from the client device for the additional information corresponding to the selected word or phrase; and
send the additional information to the client device.

5. The one or more server devices of claim 4, the one or more processors further operable to cause a server device to:
determine a characteristic of the image, the one or more topics being determined using at least one of the recognized text and the characteristic.

6. The one or more server devices of claim 5, wherein the characteristic is one of: a word in the image, a phrase in the image, an object in the image, a color in the image, a name in the image, an acronym in the image, a logo in the image, a trademark in the image, a slogan in the image, a timestamp of the image, a geographic location associated with the image, or a source of the image.

7. The one or more server devices of claim 4, wherein determining the one or more topics corresponding to the recognized text includes:
identifying at least a portion of the recognized text in at least one of: a database, an online encyclopedia, an online dictionary, a web site, a blog, or a social media site.

8. The one or more server devices of claim 4, the one or more processors further operable to cause a server device to:
segment the image into a plurality of zones, the optical character recognition being performed on each zone.

9. The one or more server devices of claim 4, wherein the word or phrase from the recognized text for providing additional information is selected using at least one of: the one or more topics, the characteristic, or textual formatting of the word or phrase.

10. The one or more server devices of claim 4, wherein determining the one or more meanings of the selected word or phrase includes:
identifying the selected word or phrase in at least one of: a database, an online encyclopedia, an online dictionary, a web site, a blog, or a social media site.

11. The one or more server devices of claim 4, wherein the selected source of information is: a products database including product information records each identifying a product and including product information characterizing the identified product, or a publications database including publication records each identifying a publication and including publication information characterizing the identified publication.

12. A method comprising:
receiving, at a server device from a client device, an image including text;
performing optical character recognition on the image to produce recognized text;
determining one or more topics corresponding to the recognized text;
selecting a word or a phrase from the recognized text for providing additional information;
determining one or more potential meanings of the selected word or phrase;
selecting a meaning of the one or more potential meanings using the one or more topics;
selecting a source of additional information corresponding to the selected meaning;
providing an indication to the client device that additional information is available for the selected word or phrase;
receiving a request from the client device for the additional information corresponding to the selected word or phrase; and
sending the additional information to the client device.

13. The method of claim 12, further comprising:
determining a characteristic of the image, the one or more topics being determined using at least one of the recognized text or the characteristic.

14. The method of claim 12, wherein determining the one or more topics corresponding to the recognized text includes:
identifying at least a portion of the recognized text in at least one of: a database, an online encyclopedia, an online dictionary, a web site, a blog, or a social media site.

15. The method of claim 12, wherein the client device is capable of displaying at least a portion of the recognized text, the recognized text being actionable to cause a computing event to occur.

16. The method of claim 15, wherein the computing event includes one or more of: accessing a network address referenced by the displayed text, dialing a phone number referenced by the displayed text, generating an email addressed to an email referenced by the displayed text, generating a social network post referenced by the displayed text, generating a text message referenced by the displayed text, or generating an instant message (IM) referenced by the displayed text.

17. The method of claim 12, wherein the word or phrase from the recognized text for providing additional information is selected using at least one of: the one or more topics, the characteristic, or textual formatting of the word or phrase.

18. The method of claim 12, wherein determining the one or more meanings of the selected word or phrase includes:
identifying the selected word or phrase in at least one of: a database, an online encyclopedia, an online dictionary, a web site, a blog, or a social media site.

* * * * *